(12) United States Patent
Lille

(10) Patent No.: US 7,535,676 B2
(45) Date of Patent: May 19, 2009

(54) SLIDER WITH BONDING PADS OPPOSITE THE AIR BEARING SURFACE

(75) Inventor: Jeffrey S. Lille, Sunnyvale, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 500 days.

(21) Appl. No.: 10/928,513

(22) Filed: Aug. 26, 2004

(65) Prior Publication Data

US 2006/0044689 A1    Mar. 2, 2006

(51) Int. Cl.
G11B 5/60 (2006.01)
G11B 15/64 (2006.01)

(52) U.S. Cl. .................. 360/234.5; 360/234.6
(58) Field of Classification Search ... 360/234.1–234.5; 29/603.05, 603.07, 603.12
See application file for complete search history.

(56) References Cited

U.S. PATENT DOCUMENTS

| | | | |
|---|---|---|---|
| 4,698,708 A | | 10/1987 | Lazzari |
| 4,761,699 A | * | 8/1988 | Ainslie et al. ............ 360/234.5 |
| 4,789,914 A | | 12/1988 | Ainslie et al. |
| 4,809,103 A | | 2/1989 | Lazzari |
| 5,124,864 A | * | 6/1992 | Matsuzaki ............... 360/244.4 |
| 5,187,623 A | | 2/1993 | Ibaraki |
| 5,200,869 A | | 4/1993 | Matsuzaki |
| 5,530,604 A | * | 6/1996 | Pattanaik ................. 360/234.5 |
| 5,657,186 A | * | 8/1997 | Kudo et al. .............. 360/234.5 |
| 5,896,244 A | * | 4/1999 | Watanabe et al. ........ 360/234.6 |
| 5,896,248 A | | 4/1999 | Hanrahan et al. |
| 5,914,834 A | * | 6/1999 | Gustafson ................ 360/234.5 |
| 5,995,324 A | * | 11/1999 | Haddock et al. ......... 360/234.7 |
| 6,125,014 A | * | 9/2000 | Riedlin, Jr. .............. 360/234.5 |
| 6,349,017 B1 | | 2/2002 | Schott |
| 6,650,519 B1 | * | 11/2003 | Karr et al. .................... 361/58 |
| 6,671,134 B1 | * | 12/2003 | Sasaki ........................ 360/317 |
| 6,697,232 B1 | * | 2/2004 | Hipwell, Jr. et al. ...... 360/294.5 |
| 6,725,526 B2 | * | 4/2004 | Lille .......................... 29/603.1 |
| 6,796,018 B1 | * | 9/2004 | Thornton ................. 29/603.04 |
| 6,813,118 B2 | * | 11/2004 | Pust et al. ................ 360/234.5 |

(Continued)

FOREIGN PATENT DOCUMENTS

JP    2199609    8/1990

(Continued)

OTHER PUBLICATIONS

"Multilayer Ceramic Slider for Thin Film Heads", IBM Technical Disclosure Bulletin, Dec. 1972, pp. 2183-2184.

(Continued)

Primary Examiner—Brian E Miller
Assistant Examiner—Adam B Dravininkas
(74) Attorney, Agent, or Firm—Merchant & Gould

(57) ABSTRACT

A slider having bonding pads opposite an air bearing surface and a method for producing the same is disclosed. Bonding pads are formed on the side of a slider assembly opposite the air bearing surface (ABS) to allow electrical probing devices on the slider while applying pressure to the slider during the lapping process and to allow a flip chip bonding process of the slider to the suspension thereby reducing or eliminating the need to bend wires and attach to the end of the slider body.

28 Claims, 12 Drawing Sheets

U.S. PATENT DOCUMENTS

| | | | |
|---|---|---|---|
| 6,858,943 B1 * | 2/2005 | Peterson et al. | 257/784 |
| 7,002,779 B2 * | 2/2006 | Zhu et al. | 360/234.5 |
| 7,012,855 B1 * | 3/2006 | Loaiza | 368/17 |
| 7,196,872 B2 * | 3/2007 | Chaw et al. | 360/235.1 |

FOREIGN PATENT DOCUMENTS

| | | |
|---|---|---|
| JP | 4162210 | 6/1992 |
| JP | 732705 | 6/1995 |
| JP | 9190610 | 7/1997 |
| JP | 11354583 A * | 12/1999 |
| JP | 2002313990 A * | 10/2002 |
| JP | 2004158679 A * | 6/2004 |

OTHER PUBLICATIONS

Tam et al., "Laser Bending of Ceramics and Application to Manufacture Magnetic Head Sliders in Disk Drives", Analytical Sciences, Apr. 2001, vol. 17, pp. 419-421.

Simons, "Flip-Chip Package", pp. 184-186, Mar. 2002.

* cited by examiner

SLIDER WITH BONDING PADS OPPOSITE THE AIR BEARING SURFACE

BACKGROUND OF THE INVENTION

1. Field of the Invention

This invention relates in general to magnetic storage systems, and more particularly to a slider having bonding pads opposite an air bearing surface and a method for producing the same.

2. Description of Related Art

Typically, a disk drive contains a number of magnetic disks attached to a common spindle for rotation. The surfaces of the magnetic disks have an associated head arm assembly that includes a head gimbal assembly (HGA). The head arm assemblies are generally attached to an actuator for positioning magnetic transducers formed with the HGAs with reference to data tracks on the magnetic disks. An HGA typically comprises a load beam, a flexible element or a flexure, and a slider. The flexure has one end attached to the load beam while the slider is joined to the other end of the flexure. The slider carries one or more transducers at it trailing edge, as is well known in the art. Transducer wires are connected to the transducers to conduct signals between the transducers and head circuitry.

The HGA serves to dynamically adjust the orientation of the slider to conform to the disk surface while the disk is spinning. The topology of the disk surface, though highly polished, is not uniform if viewed at a microscopic scale. Moreover, the disk surfaces are not rotating about the common shaft at a perfectly perpendicular angle. A minute angular deviation would translate into varying disk-to-slider distances while the disk is spinning. For reliable data writing and reading, the slider thus has to faithfully follow the topology of the spinning disk.

Today's storage systems require a smaller overall disk drive height achieved by providing a lower stacking height of the head gimbal assembly (HGA). One critical element of the disk drive is the magnetic recording head. Without the head, the drive cannot read from, or write to, magnetic media. At the same time, the design of the head embodies both mechanical and electrical advances. For example, the head has at least one surface that is patterned and contoured to float above the disk. Additionally, the head must have the necessary electrical integrity to process the subject information.

In the past, disk drive assembly has relied upon adhesives to attach the top (opposite the air bearing surface) of the head to the suspension and solder or metal balls to electrically connect the end bond pads. In a conventional suspension, the electrical connection between a transducer and read/write driver electronics is made by twisted wires that run the length of the suspension load beam and extend over the flexure and slider. The ends of the wires are soldered or ultrasonically bonded to the transducer on the slider. Other systems have used bond pads on the top surface to provide electrical and mechanical connections.

The ability to produce pads on the side opposite the air bearing surface (ABS) is advantageous to the slider fabrication and gimbal attach process. For example, it is helpful to the slider fabrication process if the devices on the slider could be electrically probed while applying pressure to the slider during the lapping process. The advantages to the gimbal attachment process include the possibility to use a flip chip bonding process and reducing or eliminating the need to bend wires and attach to the end of the slider body. However, previous methods for providing pads have been complicated.

It can be seen that there is a need for a slider having bonding pads opposite an air bearing surface and a method for producing the same.

SUMMARY OF THE INVENTION

To overcome the limitations in the prior art described above, and to overcome other limitations that will become apparent upon reading and understanding the present specification, the present invention discloses a slider having bonding pads opposite an air bearing surface and a method for producing the same.

The present invention solves the above-described problems by forming bonding pads on the side of a slider assembly opposite the air bearing surface (ABS) to allow electrical probing devices on the slider while applying pressure to the slider during the lapping process and to allow a flip chip bonding process of the slider to the suspension thereby reducing or eliminating the need to bend wires and attach to the end of the slider body.

A slider assembly in accordance with the principles of the present invention includes a slider layer having an air bearing surface (ABS), slider body and a plane for a magnetic transducer and at least one bonding pad for providing direct electrical suspension coupling disposed on a side of the slider layer opposite to the ABS, wherein the bonding pad comprises at least one gold layer and is deposited above the slider body and between the slider body and the plane for the magnetic transducer.

In another embodiment of the present invention, a magnetic storage system is provided. The magnetic storage system includes at least one magnetic storage medium, a motor for moving the at least one magnetic storage medium, at least one slider assembly for flying over the data surface of the at least one magnetic storage medium and an actuator, coupled to the slider, for positioning the slider relative to the at least one magnetic storage medium, wherein the slider assembly further includes a slider layer having an air bearing surface (ABS), slider body and a plane for a magnetic transducer and at least one bonding pad for providing direct electrical suspension coupling disposed on a side of the slider layer opposite to the ABS, wherein the bonding pad comprises at least one gold layer and is deposited above the slider body and between the slider body and the plane for the magnetic transducer.

In another embodiment of the present invention, a method for forming a slider assembly is provided. The method includes forming a slider layer having an air bearing surface and forming, above the slider layer and prior to fabrication of a magnetic transducer, at least one bonding pad for providing direct electrical suspension coupling on a side of the slider layer opposite to the air bearing surface.

In another embodiment of the present invention, a method for forming a slider row assembly is provided. The method for forming a slider includes forming a slider layer having an air bearing surface, forming a seed layer, depositing a masking layer over the seed layer, forming vias in the photoresist, depositing a first plated metal layer in the vias, removing part of the masking layer from the first plated metal layer, plating a second metal layer over the first plated metal layer, removing all masking layers along with the seed layer that is not under the first and second plated layers, constructing a magnetic head and slicing the slider assembly along a first line to form the air bearing surface and along a second line to form the flex side to create individual slider assemblies with connection pads providing on the side opposite the air bearing surface (ABS).

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a slider having bonding pads opposite an air bearing surface and a method for producing the same. The present invention solves the above-described problems by forming bonding pads on the side of a slider assembly opposite the air bearing surface (ABS) to allow electrical probing devices on the slider while applying pressure to the slider during the lapping process and to allowing a flip chip bonding process of the slider to the suspension thereby reducing or eliminating the need to bend wires and attach to the end of the slider body.

Figure 1:
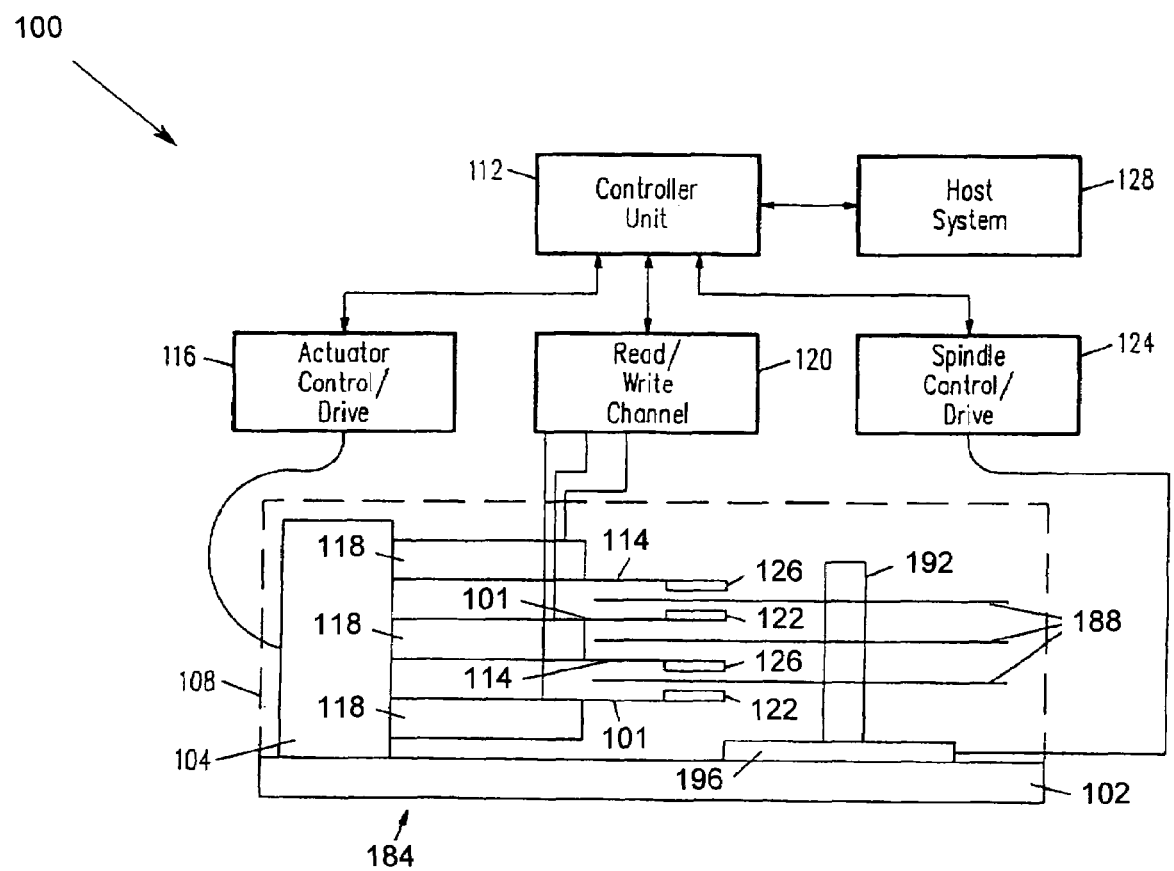
FIG. 1 illustrates a magnetic storage system according to an embodiment of the present invention.

FIG. 1 illustrates a magnetic storage system 100 according to an embodiment of the present invention. In FIG. 1, a magnetic recording disk file 184 that utilizes the transducer suspension system 101. It should be appreciated that the suspension system 114 is identical to the suspension system 101 so that the following comments apply equally to either the suspension system 101 or the suspension system 114. It should also be appreciated that the suspension systems 101 and 114 could be used with other data storage systems, such as floppy disk drives, optical drives or compact disk players.

The disk file 184 comprises a plurality of magnetic recording disks 188 suitable for use in hard disk drives. The disks 188 are mounted on a spindle shaft 192 that is connected to a spindle motor 196. Motor 196 is mounted to a chassis 102.

The plurality of read/write sliders 122 and 126 are positioned over the disks 188 such that each disk 188 can be accessed by one of the sliders 122 or 126. Each of the sliders 122 and 126 includes a transducer for reading and writing data on a plurality of concentric data tracks on the disks 188 and are attached to one of the suspension systems 101 (or 114). Each of the suspension systems 101 (or 114) is attached to the actuator arm 118 that is attached to a rotary actuator 104. The rotary actuator 104 moves the actuator arm 118, and hence the suspension system 101 or 114 and the sliders 122 or 126, in a radial direction across the disk 188. An enclosure 108 (shown by a dashed line in FIG. 1) seals the disk file 184 and provides protection from particulate contamination.

A controller unit 112 provides overall control to the system 184. The controller unit 112 contains a central processing unit (CPU), memory unit and other digital circuitry and is connected to an actuator control/drive unit 116 that in turn is electrically connected to the actuator 104. This allows the controller 112 to control the movement of the sliders 122 and 126 over the disks 188. The controller 112 is electrically connected to a read/write channel 120 that in turn is electrically connected to the sliders 122 and 126. This allows the controller 112 to send and receive data from the disks 188. The controller 112 is electrically connected to a spindle control/drive unit 124 that in turn is electrically connected to the spindle motor 196. This allows the controller 112 to control the rotation of the disks 188. A host system 128, which is typically a computer system, is electrically connected to the controller unit 112. The host system 128 may send digital data to the controller 112 to be stored on the disks 188, or may request that digital data be read from the disks 188 and sent to the system 128.

Figure 2:
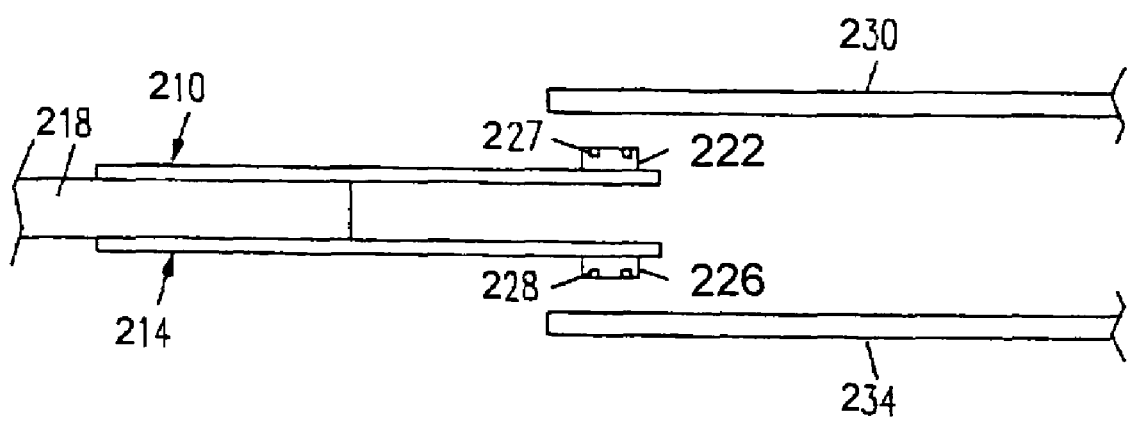
FIG. 2 illustrates a suspension assembly according to an embodiment of the present invention.

FIG. 2 illustrates a suspension assembly 200 according to an embodiment of the present invention. In FIG. 2, the suspension assembly 200 includes a first transducer suspension 210 and a second transducer suspension 214 attached to an actuator arm 218. The suspensions 210 and 214 are also referred to as head gimbal assemblies.

A first slider 222 is positioned at an end of the first transducer suspension 210 distally to the arm 218. A second slider 226 is positioned at an end of the second transducer suspension 214 distally to the arm 218. The slider 222 includes one or more data transducers 227 for reading and/or writing data on a magnetic medium such as a hard magnetic disk 230. Similarly, the slider 226 includes one or more data transducers 228 for reading and/or writing data on a magnetic medium such as a hard magnetic disk 234.

Hard disk drives (HDDs) are increasingly required to be downsized with ever-higher recording density and, hence, have ever-higher track density and ever-narrower track width. To further downsize HDDs, integrated lead suspensions and flexures for supporting read and/or write heads over the rotating recording media in magnetic disk drives have been used. Methods which can provide a very high (electrical) interconnect density resulting in compact design are needed. Further, these features should be provided without the need for additional processing steps or materials (e.g., conductive adhesive). To be commercially viable, the structure and method must be capable of enabling the sliders to be efficiently mounted to the suspension with high-quality electrical connections.

The ability to produce pads on the side opposite the air bearing surface (ABS) is advantageous to the slider fabrication and gimbal attach process. For example, it is helpful to the slider fabrication process if the devices on the slider could be electrically probed while applying pressure to the slider during the lapping process. The advantages to the gimbal attachment process include the possibility to use a flip chip bonding process and reducing or eliminating the need to bend wires and attach to the end of the slider body.

Figure 3:
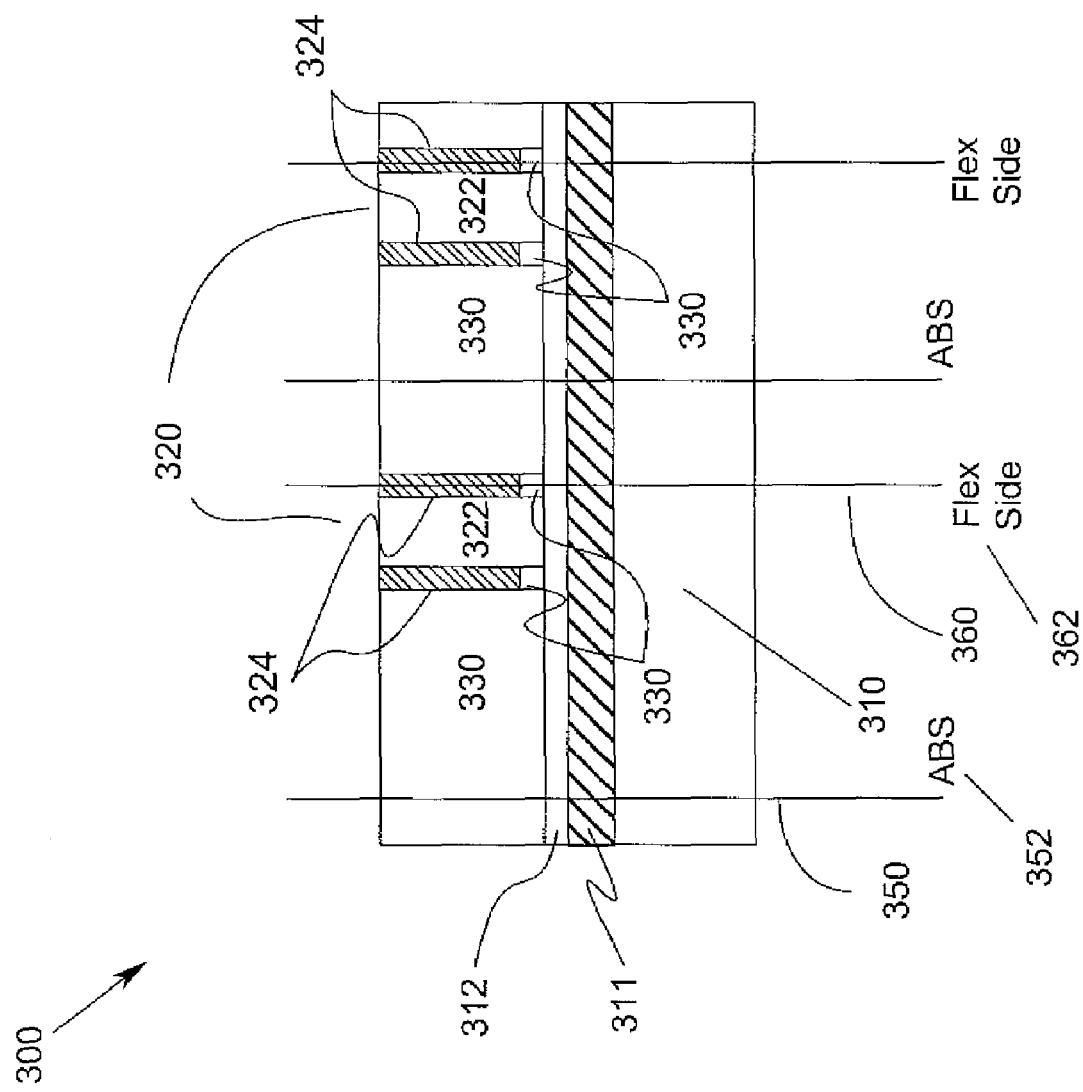
FIG. 3 illustrates a flip chip design for a slider according to an embodiment of the present invention.

FIG. 3 illustrates a flip chip design 300 for a slider according to an embodiment of the present invention. In FIG. 3, an $Al_2O_3/TiC$ composite ceramic (N58) is used to construct the slider 310 for a magnetic recording head in a storage device, e.g., such as a hard disk. Patterning on the N58 slider 310 is done using Reactive Ion Etch (RIE) and photolithography. A seed layer 312 is deposited over the slider 310. Pads 320 are provided by depositing (e.g., electroplating) copper 322 and gold 324 layers over the seed layer 312 where in the final head, the adjacent material will be an insulator like alumina 330. An insulation layer 311 will exist between pads 320 and the slider 310. This insulation layer 311 may be comprised of alumina. The flip chip design 300 for the slider may then be sliced to create individual slider assemblies with connection pads providing on the side opposite the air bearing surface (ABS). The flip chip design 300 for the slider is sliced along a first line 350 to form the air bearing surface 352 and along a second line 360 to form the flex side 362. This process is repeated for each individual slider assembly or collection of slider assemblies.

Figure 4:
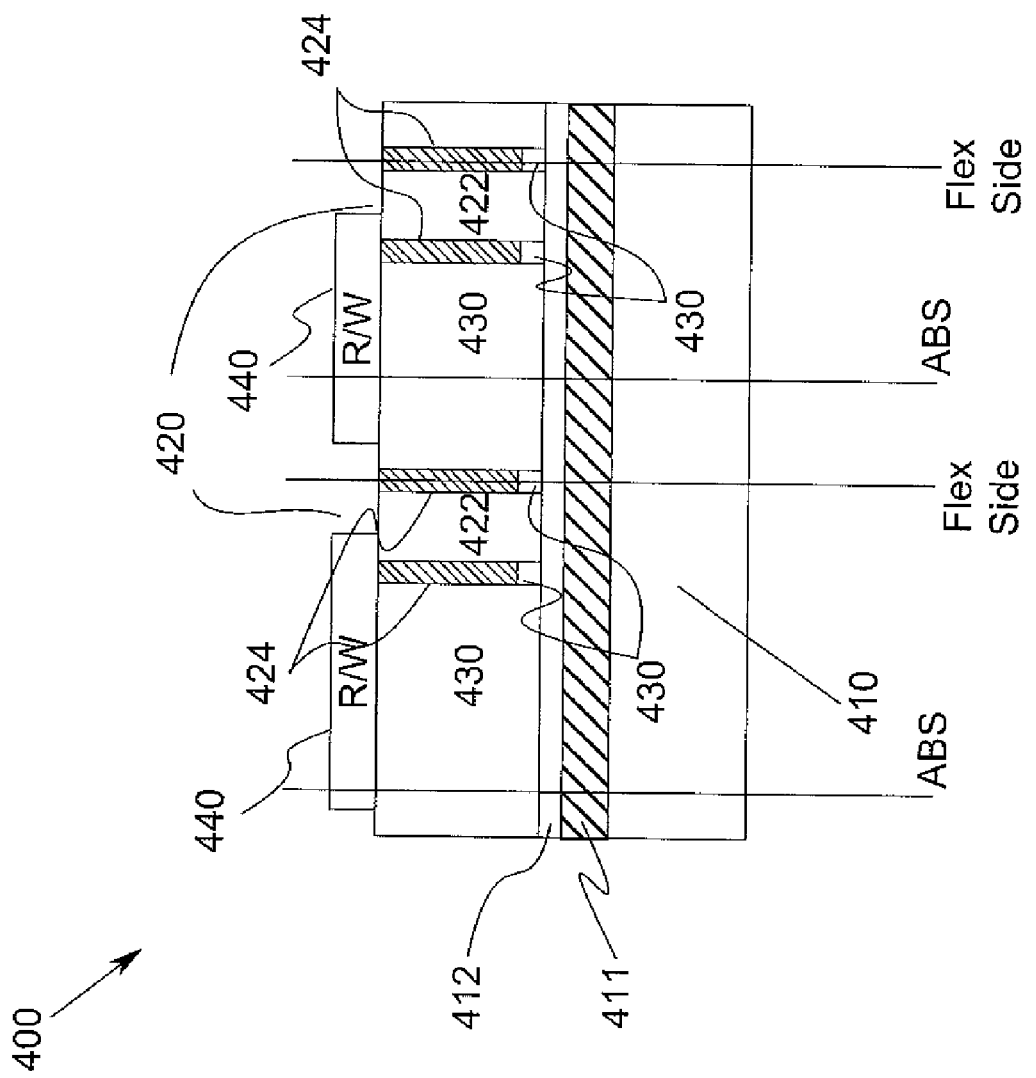
FIG. 4 illustrates a flip chip slider design having read/write heads coupled to the pads according to an embodiment of the present invention.

FIG. 4 illustrates a flip chip slider design 400 having read/write heads coupled to the pads according to an embodiment of the present invention. As was illustrated with respect to FIG. 3, flip chip slider design 400 of FIG. 4 shows a N58 slider layer 410, insulation layer 411, seed layer 412, and pads 420 of copper 422 and gold 424 disposed over the seed layer 412 between alumina material 430. Read/write heads 440 are formed over the layer of alumina 430 and the pads 420 disposed over the seed layer 412. The pads 420 provide a connection to the leads (not shown) of the read/write head 440.

Figure 5:
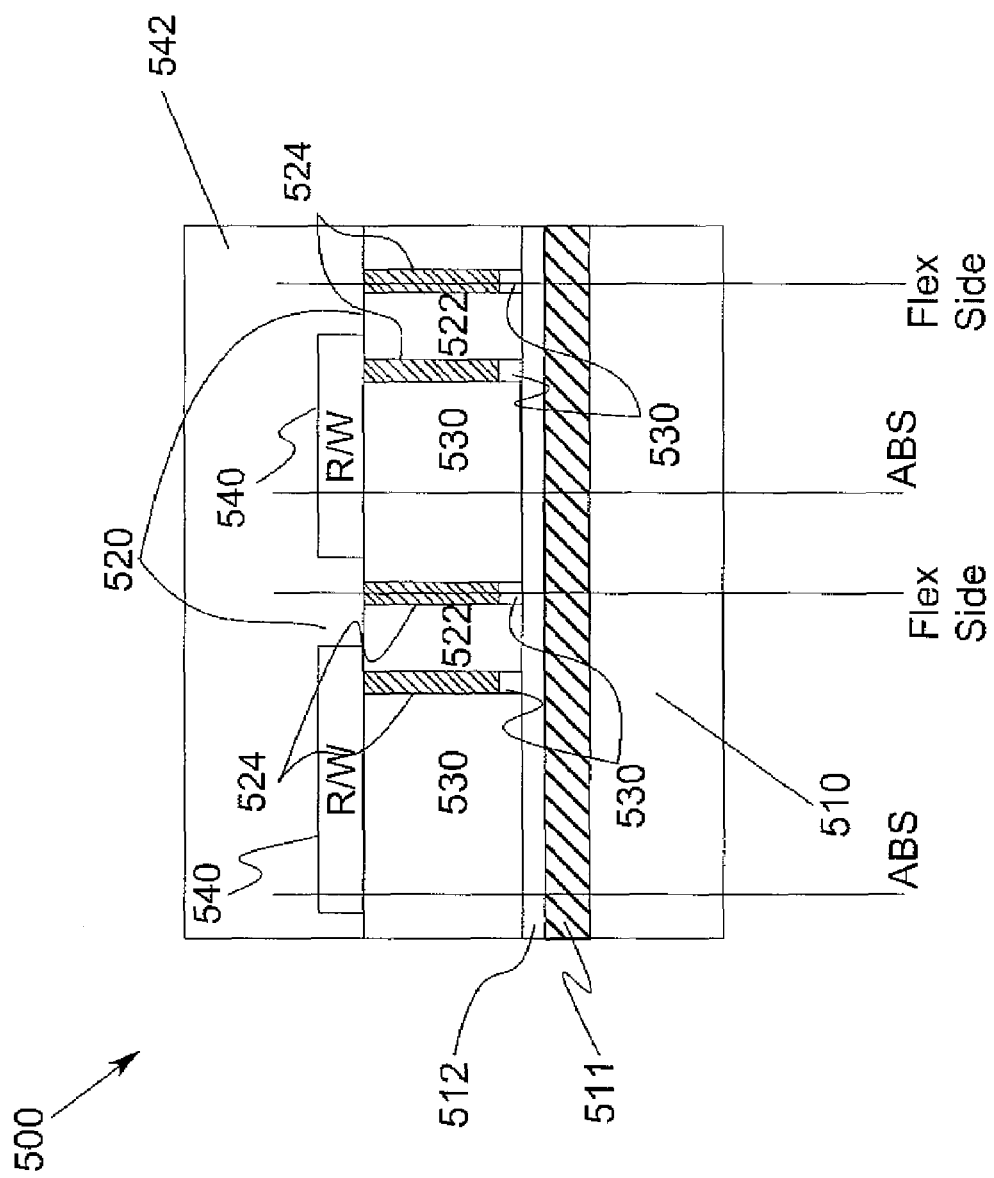
FIG. 5 illustrates a flip chip slider design having an overcoat deposited over the read/write heads according to an embodiment of the present invention.

FIG. 5 illustrates a flip chip slider design 500 having an overcoat deposited over the read/write heads according to an embodiment of the present invention. Again, the flip chip slider design 500 of FIG. 5 shows a N58 slider layer 510, insulation layer 511, seed layer 512, pads 520 of copper 522 and gold 524 disposed over the seed layer 512 between alumina material 530 and read/write heads 540 disposed over the alumina 530 and pads 520. An overcoat 542 is deposited over the read/write heads 540 to avoid lapping rolloff from affecting the read/write ABS surface.

Figure 6:
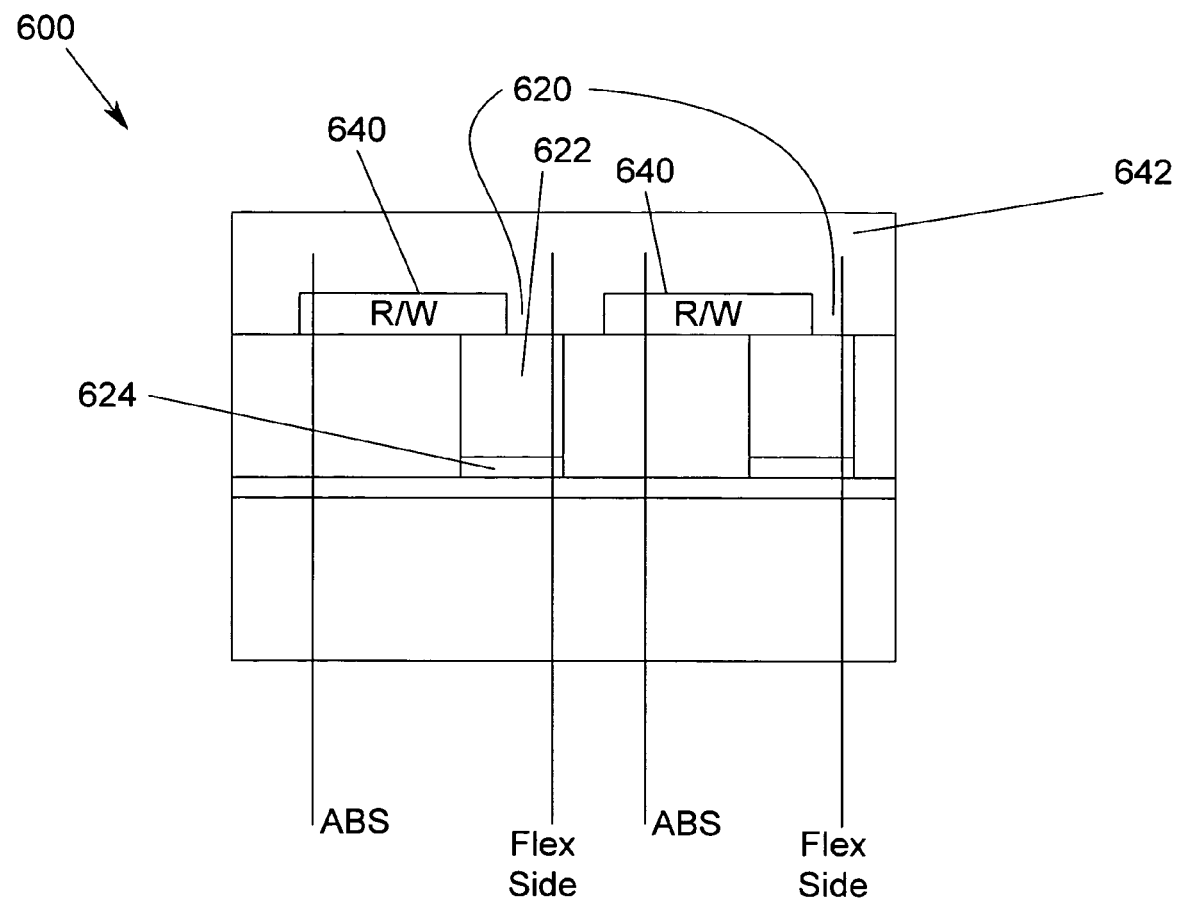
FIG. 6 illustrates a second embodiment of a flip chip slider design having an overcoat deposited over the read/write heads.

FIG. 6 illustrates a second embodiment of a flip chip slider design 600 having an overcoat 642 depositing over the read/write heads 640. In FIG. 6, the pads 420 are formed by first depositing a layer of gold 624 and then, preferably, depositing a non-gold layer 622, such as copper or NiFe.

Figure 7:
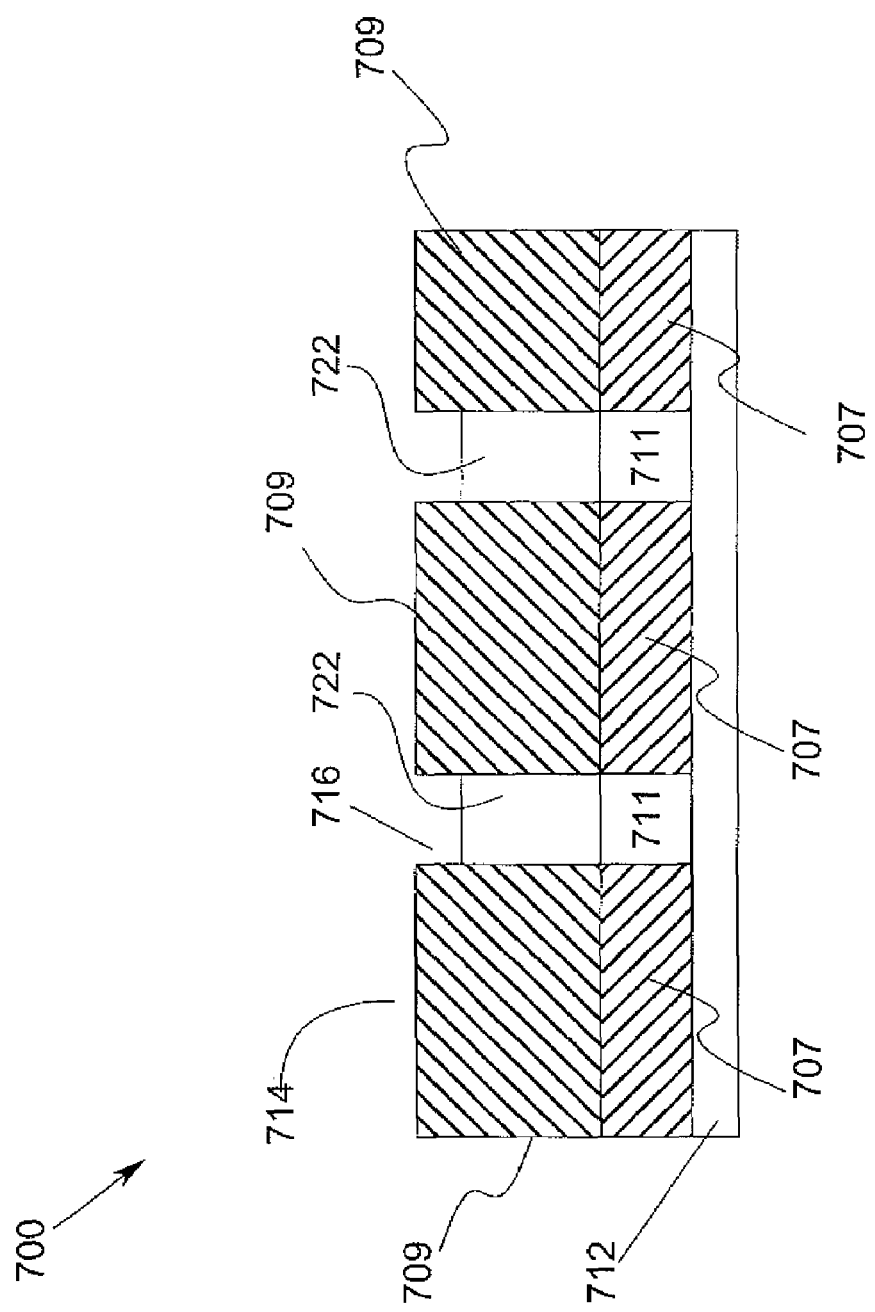
FIGS. 7-10 illustrate steps in forming pads on the side opposite the air bearing surface (ABS) according to an embodiment of the present invention.

FIGS. 7-10 illustrate steps in forming pads on the side opposite the air bearing surface (ABS) according to an embodiment of the present invention. FIG. 7 illustrates the first step 700 according to an embodiment of the present invention. In FIG. 7, a conductive seed layer 712 is formed. A masking layer 714 is deposited over the seed layer 712. Preferably, the masking layer 714 will include more than one component. The first layer 707 will ideally have no photoactive compound. An example may be poly-methylmethacrylate (PMMA) or a polyimide-like material. The second masking layer 709 will be a photoresist material. The resist layer 709 is developed to expose the vias 716. An etching step (e.g., reactive ion etching with an oxygen containing plasma) is performed to remove the first masking layer 707 in the base 711 of the vias 716. This will create a via 716 with the seed layer 712 exposed. The seed layer 712 is preferably plated with a non-gold material 722 to fill most of the via 716. After the first plating has occurred, the photomask 709 is blanket exposed and developed. This will leave the plated via with the first masking layer 707 remaining.

Figure 8:
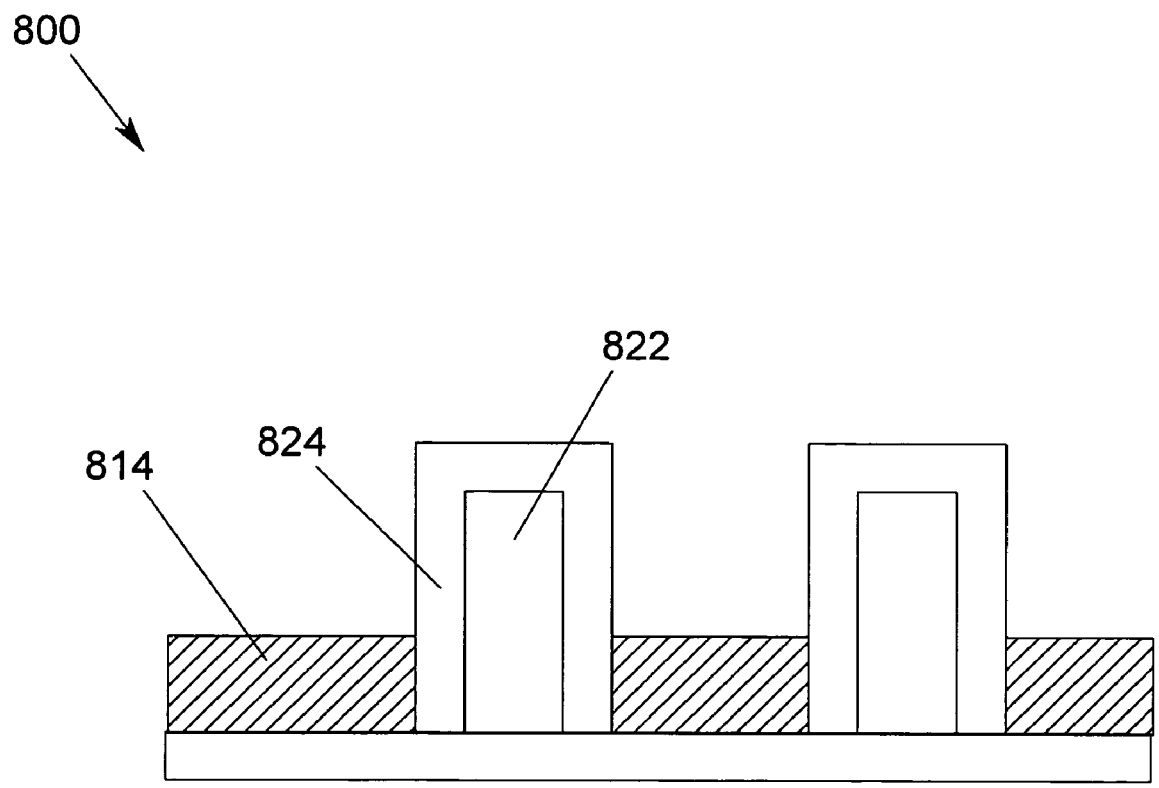

FIG. 8 illustrates the second step 800 according to an embodiment of the present invention. In FIG. 8, the first masking layer is etched down and away from the first plated layer 822. Gold 824 is then plated over the first plated layer 822. The second plated layer 824 preferably is a noble metal and is ideally a gold alloy.

Figure 9:
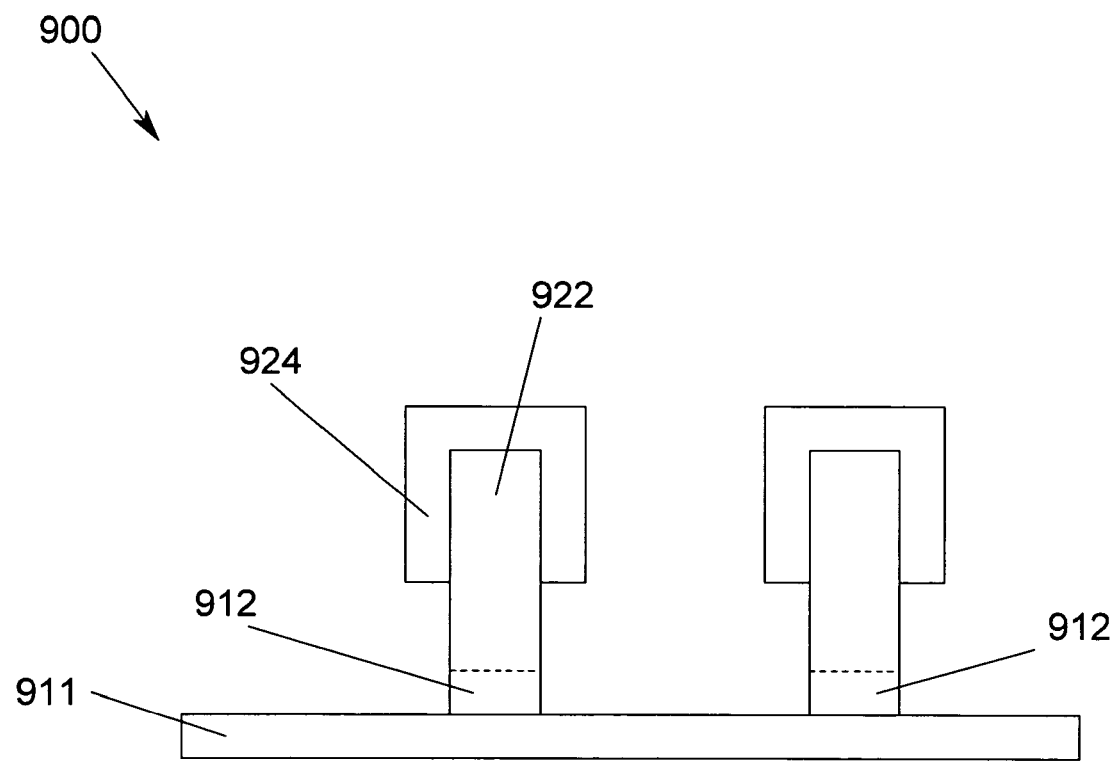

FIG. 9 illustrates the next step 900 according to an embodiment of the present invention. In FIG. 9, the remaining resist is removed via solvent along with portions of the seed layer via sputtering that are not under the plated gold 924 and copper 922 layer leaving only portions of the seed layer 912 copper 922 layer. This will expose an insulation layer 911 in the non-stud region.

Figure 10:
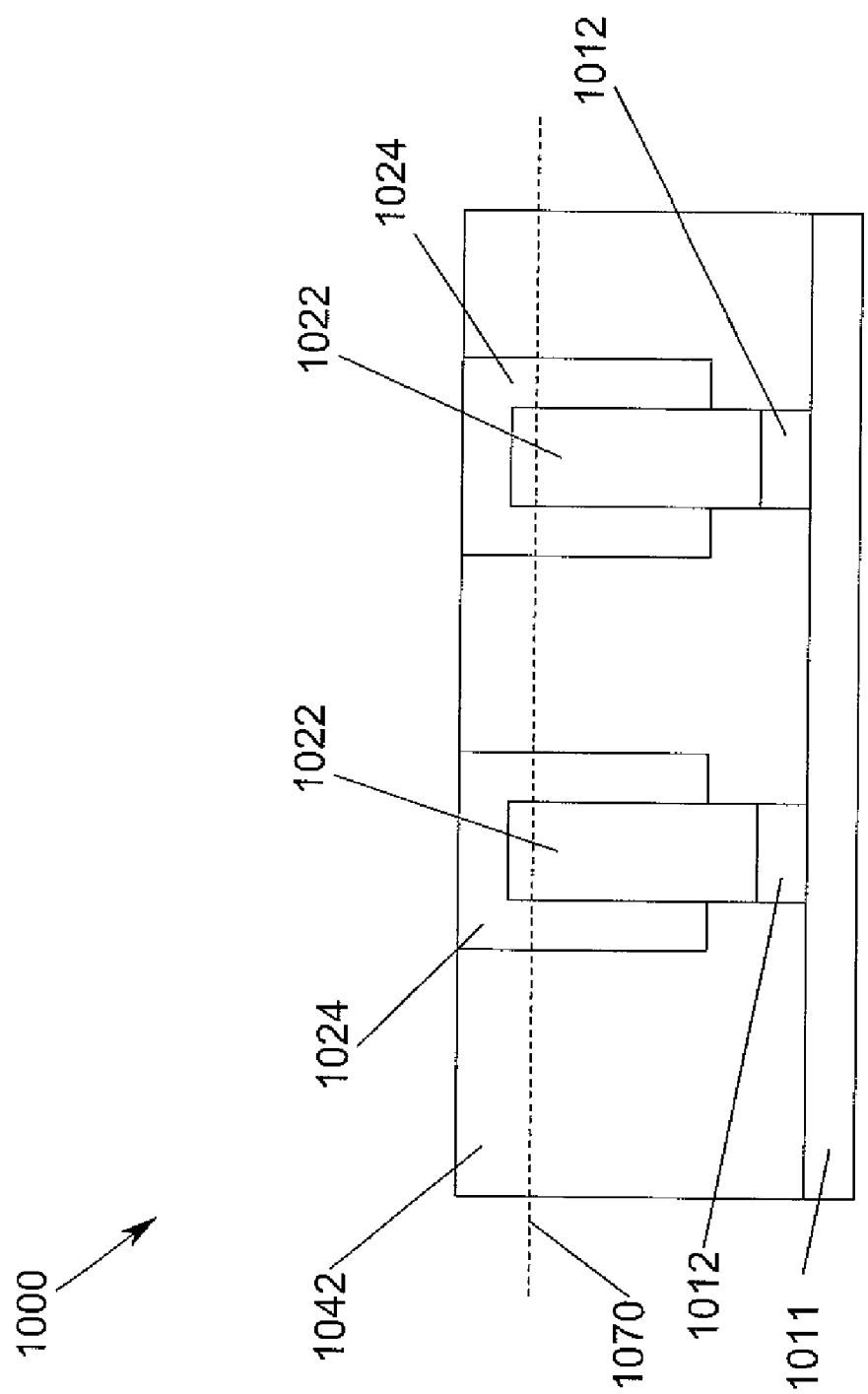

FIG. 10 illustrates the next step 1000 according to an embodiment of the present invention. In FIG. 10, an oxide layer 1042 is deposited over the insulation layer 1011, seed layer 1012 and gold layer 1024. FIG. 10 also illustrates a planarization plane 1070 that the materials may be etched or polished down to. Once the oxide layer 1042 is deposited, a small void may be present adjacent to the remaining seed layer 1012.

Figure 11:
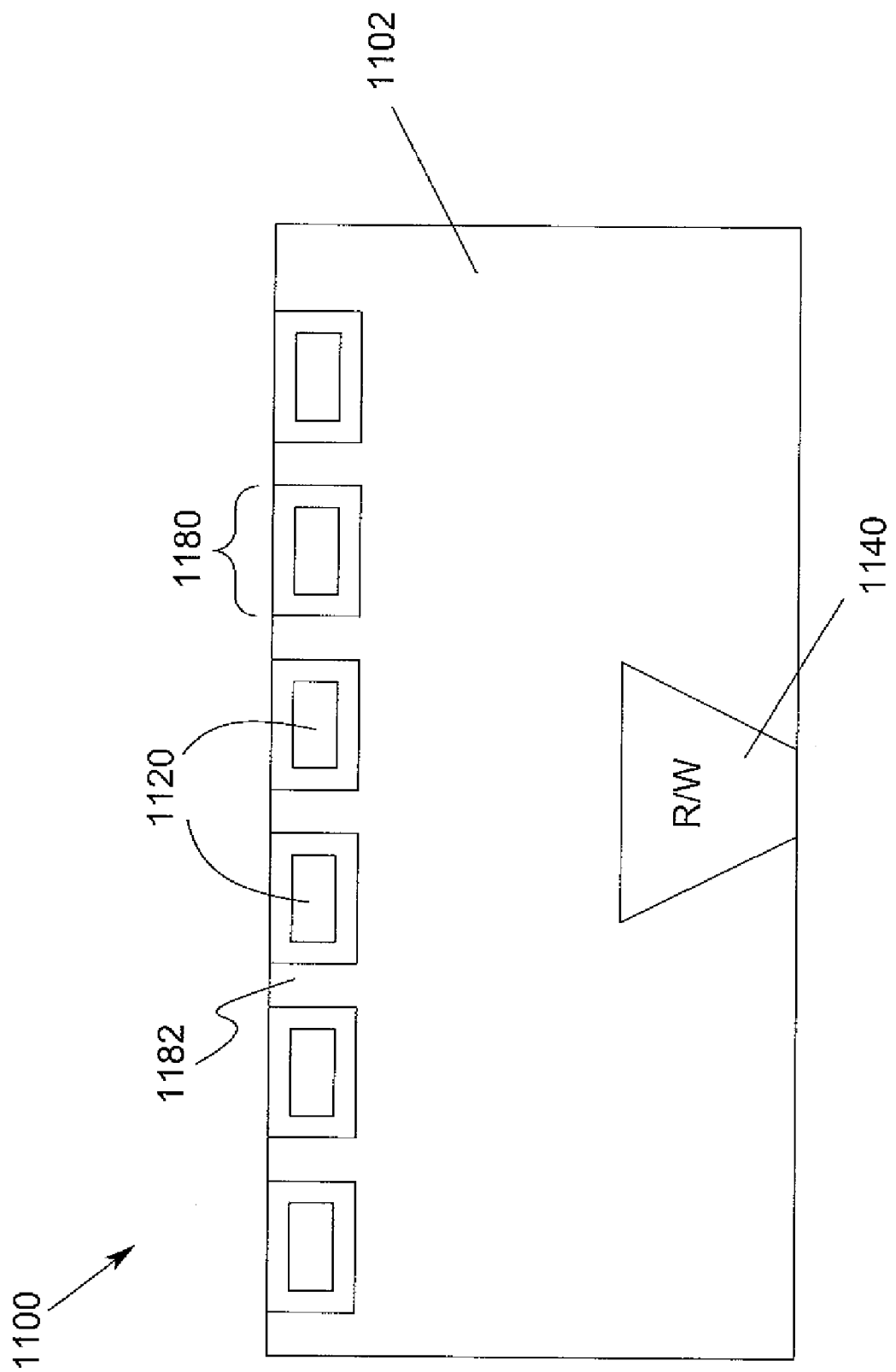
FIG. 11 illustrates a six pad slider assembly according to an embodiment of the present invention.

FIG. 11 illustrates a six pad slider assembly 1100 according to an embodiment of the present invention. FIG. 11 shows a substrate 1102 having a read/write head 1140 formed thereon. Six pads 1120 are provided on the side opposite the air bearing surface (ABS). However, the slider may have a different number of pads of different shape and location. As shown In FIG. 11, the pad width 1180 and pad separation 1182 may designed for a symmetric layout. For example, the pad width 1180 may be 70 μm and the spacing 1182 between pads 1120 may be 40 μm. The height of the pads 1120 is lithography limited because the pads 1120 are flex bonded (i.e., approximately 25 μm). A trade-off is involved in forming the pads 1120. Short of plating an entire stud out of gold, the surface thickness will limit the flex side lapping process window if the plated gold is 4 μm thick. The tolerance in defining the flex side of the slider assembly 1100 will, in part, determine the location and height of the pad 1120.

Figure 12:
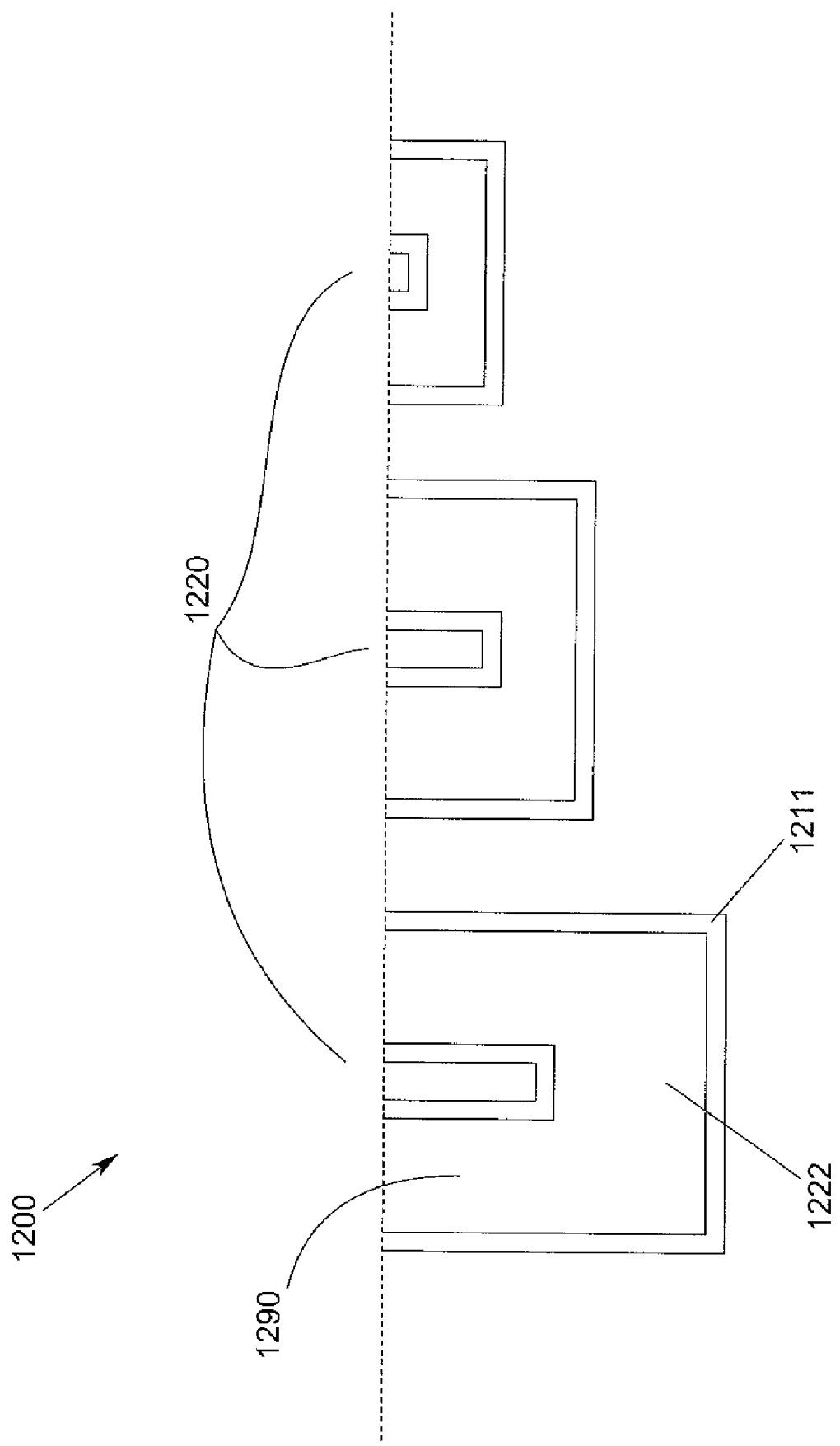
FIG. 12 illustrates the flexside of slider lapping surface showing the bonding pads according to an embodiment of the present invention.

FIG. 12 illustrates the flexside of slider lapping surface 1200 showing the bonding pads 1220 according to an embodiment of the present invention. For a 40 μm×70 μm flexside stud, the surface area varies. For a rectangle pad having a gold area of 2800 μm$^2$, the flexside lapping window is 4 μm for a gold plating thickness of a gold layer. For a C-shaped pad 1290 having a gold area of 640 μm$^2$, the flexside lapping window is 25 μm. It is also possible that two different materials comprise each stud. Improvements in stud lithography may enable an increase in surface area. For example, image transfer of the stud may provide an increase in surface area, but involves more processing. The flexside lapping may expose the second plated material 1222 that should not have corrosion nor interfere with the slider fabrication process.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider assembly, comprising:
   a slider layer having an air bearing surface (ABS), slider body and a plane for a magnetic transducer; and
   at least one bonding pad for providing direct electrical suspension coupling disposed on a flex side of the slider layer opposite to the ABS,
   wherein the bonding pad comprises a surface material and a plurality of studs extending down into the surface material, a plate layer surrounding each of the studs, a first of the plurality of studs being linked to a second of the plurality of studs by a conductive seed layer formed below the surface material.

2. The slider assembly of claim 1, wherein the slider layer comprises an $Al_2O_3/TiC$ composite ceramic (N58).

3. The slider assembly of claim 1, wherein the conductive seed layer is disposed between the slider layer and the at least one bonding pad.

4. The slider assembly of claim 1, wherein the stud comprises a copper stud and the plate layer comprises a gold plate layer.

5. The slider assembly of claim 1, wherein the bonding pad comprises more than one layer comprising different materials.

6. The slider assembly of claim 1, wherein the bonding pad includes a first and a second plated layer.

7. The slider assembly of claim 1 further comprising a read/write head coupled to the at least one bonding pad.

8. The slider assembly of claim 7 further comprising an overcoat deposited over the read/write head.

9. The slider assembly of claim 1, wherein the surface material comprises an insulation layer that is exposed on the side of the slider opposite the ABS, wherein the insulation layer surrounds each of the plurality of studs.

10. The slider assembly of claim 1, wherein the at least one bonding pad comprises a predetermined number of bonding pads having a predetermined pad width and pad separation.

11. The slider assembly of claim 1, wherein the at least one bonding pad comprises at least one rectangle pad.

12. The slider assembly of claim 11, wherein the at least one rectangle pad comprises an area of less than 5000 $\mu m^2$ at the surface of the slider opposite the ABS.

13. The slider assembly of claim 1, wherein the at least one bonding pad comprises at least one C-shaped pad.

14. The slider assembly of claim 13, wherein the at least one C-shaped pad comprises an area of less than 5000 $\mu m^2$.

15. A magnetic storage system, comprising
   at least one magnetic storage medium;
   a motor for moving the at least one magnetic storage medium;
   at least one slider assembly for flying over the data surface of the at least one magnetic storage medium; and
   an actuator, coupled to the slider, for positioning the slider relative to the at least one magnetic storage medium;
   wherein the slider assembly further comprises
      a slider layer having an air bearing surface (ABS), slider body and a plane for a magnetic transducer; and
      at least one bonding pad for providing direct electrical suspension coupling disposed on a flex side of the slider layer opposite to the ABS,
      wherein the bonding pad comprises a surface material and a plurality of studs extending down into the surface material, a plate layer surrounding each of the studs, a first of the plurality of studs being linked to a second of the plurality of studs by a conductive seed layer formed below the surface material.

16. The magnetic storage system of claim 15, wherein the slider layer comprises an $Al_2O_3/TiC$ composite ceramic (N58).

17. The magnetic storage system of claim 15, wherein the conductive seed layer is disposed between the slider layer and the at least one bonding pad.

18. The magnetic storage system of claim 15, wherein the stud comprises a copper stud and the plate layer comprises a gold plate layer.

19. The magnetic storage system of claim 15, wherein the bonding pad comprises more than one layer comprising different materials.

20. The magnetic storage system of claim 15, wherein the bonding pad includes a first and a second plated layer.

21. The magnetic storage system of claim 15 further comprising a read/write head coupled to the at least one bonding pad.

22. The magnetic storage system of claim 21 further comprising an overcoat deposited over the read/write head.

23. The magnetic storage system of claim 15, wherein the surface material comprises an insulation layer that is exposed on the side of the slider opposite the ABS, wherein the insulation layer surrounds each of the plurality of studs.

24. The magnetic storage system of claim 15, wherein the at least one bonding pad comprises a predetermined number of bonding pads having a predetermined pad width and pad separation.

25. The magnetic storage system of claim 15, wherein the at least one bonding pad comprises at least one rectangle pad.

26. The magnetic storage system of claim 25, wherein the at least one rectangle pad comprises an area of less than 5000 $\mu m^2$ at the surface of the slider opposite the ABS.

27. The magnetic storage system of claim 15, wherein the at least one bonding pad comprises at least one C-shaped pad.

28. The magnetic storage system of claim 27, wherein the at least one C-shaped pad comprises an area of less than 5000 $\mu m^2$.

* * * * *

UNITED STATES PATENT AND TRADEMARK OFFICE
CERTIFICATE OF CORRECTION

PATENT NO.       : 7,535,676 B2
APPLICATION NO.  : 10/928513
DATED            : May 19, 2009
INVENTOR(S)      : Jeffrey S. Lille Page 1 of 1

It is certified that error appears in the above-identified patent and that said Letters Patent is hereby corrected as shown below:

Title Page, item [73] Assignee: "Hitachi Global Storage Technologies B.V." should read
--Hitachi Global Storage Technologies Netherlands B.V.--

Signed and Sealed this
Thirteenth Day of September, 2011

David J. Kappos
*Director of the United States Patent and Trademark Office*